(12) United States Patent
Xu et al.

(10) Patent No.: US 12,365,320 B2
(45) Date of Patent: Jul. 22, 2025

(54) PEDAL REACTION SIMULATOR FOR VEHICLE

(71) Applicants: Hyundai Motor Company, Seoul (KR); Kia Corporation, Seoul (KR)

(72) Inventors: Tao Xu, Yantai (CN); Young Jin Jo, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 194 days.

(21) Appl. No.: 18/368,438

(22) Filed: Sep. 14, 2023

(65) Prior Publication Data

US 2024/0294154 A1 Sep. 5, 2024

(30) Foreign Application Priority Data

Mar. 2, 2023 (CN) .......................... 202310194174.5

(51) Int. Cl.
| | |
|---|---|
| *B60T 8/40* | (2006.01) |
| *B60K 26/02* | (2006.01) |
| *G05G 1/30* | (2008.04) |
| *G05G 5/03* | (2008.04) |

(52) U.S. Cl.
CPC ............ *B60T 8/409* (2013.01); *B60K 26/021* (2013.01); *G05G 1/30* (2013.01); *G05G 5/03* (2013.01)

(58) Field of Classification Search
CPC . B60T 8/409; B60T 7/042; B60T 7/06; B60T 13/12; B60T 8/4086; B60K 26/021; G05G 1/30; G05G 5/03; G05G 1/44; B60Y 2410/102
See application file for complete search history.

(56) References Cited

U.S. PATENT DOCUMENTS

| | | | | |
|---|---|---|---|---|
| 9,387,836 | B2 * | 7/2016 | Ryu | ........................... B60T 7/06 |
| 2014/0360177 | A1 * | 12/2014 | Ryu | .......................... G05G 5/03 |
| | | | | 60/556 |
| 2016/0160892 | A1 * | 6/2016 | Schepp | ............... F15B 15/1428 |
| | | | | 29/464 |
| 2021/0129814 | A1 * | 5/2021 | Esandi Murguialday | ................... |
| | | | | B60T 13/745 |

* cited by examiner

*Primary Examiner* — Sizo B Vilakazi

(74) *Attorney, Agent, or Firm* — Morgan, Lewis & Bockius LLP

(57) ABSTRACT

A pedal reaction simulator for the vehicle includes a cylinder providing a first accommodation space therein; a rotation element rotatably mounted in the first accommodation space, providing a second accommodation space therein, and including at least one sliding groove of a predetermined shape penetrating the second accommodation space formed on an external circumferential wall; a piston including at least one sliding guide member corresponding to the sliding groove and movably provided in the second accommodation space through a first end portion of the rotation element; a first elastic element mounted in the second accommodation space to elastically support the piston; a rotation resistance device provided in the cylinder, including a second elastic element, and providing a resistance to a rotation of the rotation element; and an adjustment device provided on the cylinder and adjusting a preload of the second elastic element.

16 Claims, 14 Drawing Sheets

PEDAL REACTION SIMULATOR FOR VEHICLE

CROSS-REFERENCE TO RELATED APPLICATION

The present application claims priority to Chinese Patent Application No. 202310194174.5 filed in the Chinese National Intellectual Property Administration on Mar. 2, 2023, the entire contents of which is incorporated herein for all purposes by this reference.

BACKGROUND OF THE PRESENT DISCLOSURE

Field of the Present Disclosure

The present disclosure relates to a technical field of a vehicle pedal, and to, a pedal reaction simulator for a vehicle.

Description of Related Art

Pedals of vehicles include an accelerator pedal, a brake pedal, etc. The feeling of a driver stepping on a pedal is very important for ride comfort and vehicle safety. Currently, in a lot of vehicles, a pedal reaction simulator provides a driver with a pedal reaction, allowing the driver to better control the pedal. Since the driver may control acceleration or braking by use of the pedal reaction, the pedal reaction simulator is an important part of an in-vehicle control system. However, the demand for pedal feeling may vary depending on drivers. For example, some drivers may like slightly "soft" pedal feeling, while others may like "hard" pedal feeling. Accordingly, the pedal reaction simulator of the vehicle needs to be customized to meet customization needs of different consumer groups.

Because a non-decoupled brake pedal reaction simulator is affected by the level of regenerative braking and compensation of braking force when the regenerative braking is activated and released, the pedal feeling may not be good. A decoupled brake pedal reaction simulator of the related art may eliminate the effect of different braking pressures according to different regenerative braking levels, but the pedal feeling is the same at different regenerative braking levels.

The decoupled brake pedal reaction simulator of the related art may implement different pedal feelings by simulating different pedal reaction curves through the appearance design of a rubber simulator. However, the appearance design of the rubber simulator is too complicated and the workload is large. Furthermore, once the appearance of the rubber simulator is determined, the pedal feeling is fixed and may be no longer adjusted by itself.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a pedal reaction simulator for a vehicle configured for implementing different pedal feeling trends by adjusting a pedal reaction curve according to user demands.

The present disclosure also attempts to provide a pedal reaction simulator for a vehicle configured for adjusting soft or hard feeling of a pedal by changing a preload of an elastic element of an adjustment device by a user, obtaining desired pedal feeling.

A pedal reaction simulator for a vehicle according to an exemplary embodiment of the present disclosure includes a cylinder providing a first accommodation space therein; a rotation element rotatably mounted in the first accommodation space, providing a second accommodation space therein, and including at least one sliding groove of a predetermined shape penetrating the second accommodation space formed on an external circumferential wall; a piston including at least one sliding guide member corresponding to the sliding groove and movably provided in the second accommodation space through a first end portion of the rotation element; a first elastic element mounted in the second accommodation space to elastically support the piston; a rotation resistance device provided in the cylinder, coupled to the rotation element, including a second elastic element, and configured to provide a resistance to a rotation of the rotation element; and an adjustment device provided on the cylinder, engaged to the second elastic element, and configured to adjust a preload of the second elastic element, wherein the at least one sliding guide member may be slidably mounted in a corresponding sliding groove.

A concave groove may be formed in the cylinder, a portion of the at least one sliding guide member may slide along the concave groove, and another portion of the at least one sliding guide member may slide along the at least one sliding groove so that when the piston moves along the cylinder, the rotation element may rotate through the at least one sliding groove and the at least one sliding guide member.

In an exemplary embodiment of the present disclosure, the rotation resistance device may include a tooth portion provided on an external circumferential wall of a second end portion of the rotation element; and a rack member including a first end portion engaged with the tooth portion and a second end portion connected to the second elastic element to provide a resistance to the rotation of the rotation element through an elastic deformation of the second elastic element due to the rotation of the rotation element.

The rotation resistance device may further include a position limiting sheet provided between the rack member and the second elastic element, the second elastic element may be a spring, and the adjustment device is connected to the spring and configured to adjust the preload of the spring.

The adjustment device may include an adjustment tube including a first tube diameter, provided to be connected to the first accommodation space of the cylinder in a tangential direction of the rotation element, and providing an adjustment space for accommodating the spring and the position limiting sheet therein; a connection tube including a second tube diameter, located between the adjustment space and the first accommodation space, and providing a connection space for accommodating the rack member therein so that the rack member enters the first accommodation space through the connection space and is engaged with the tooth portion of the rotation element; and a piston sheet provided on the adjustment space and connected to the spring.

The position limiting sheet and the piston sheet may be movable in the adjustment space, the spring may be connected between the position limiting sheet and the piston sheet, a pressure adjustment oil may be filled in the adjustment tube on an opposite side of the cylinder with respect to the piston sheet, and the pressure of the pressure adjustment oil in the adjustment tube may be adjusted to adjust the preload of the spring.

The second tube diameter of the connection tube may be smaller than the first tube diameter of the adjustment tube to limit the position limiting sheet of the adjustment tube from entering the connection tube.

The adjustment device may further include a pressure sensor provided in the adjustment tube on the opposite side of the cylinder with respect to the piston sheet, and detecting a pressure of the pressure adjustment oil in the adjustment tube, when the pressure of the pressure adjustment oil in the adjustment tube is high, because the preload of the spring is large, a relatively large resistance may be provided against the rotation of the rotation element, and when the pressure of the pressure adjustment oil in the adjustment tube is low, because the preload of the spring is small, a relatively small resistance may be provided against the rotation of the rotation element.

In another exemplary embodiment of the present disclosure, the rotation resistance device may include a locking groove formed on the external circumferential wall of the second end portion of the rotation element, one end portion of the second elastic element may be coupled to the locking groove, and the other end portion of the second elastic element may be coupled to the adjustment device so that the rotation resistance device is configured to provide the resistance to the rotation of the rotation element through elastic deformation of the second elastic element due to the rotation of the rotation element.

The second elastic element may be a torsion spring or a coil spring, the adjustment device may include a push rod and an actuator, one end portion of the push rod may be connected to the torsion spring or the coil spring, and the actuator may be connected to the other end portion of the push rod and configured to adjust the preload of the torsion spring or the coil spring by pushing or pulling the push rod.

The pedal reaction simulator for the vehicle may further include a support assembly provided at the second end portion of the rotation element to support the rotation element and the first elastic element provided in the rotation element.

The support assembly may include a thrust ball bearing connected to the second end portion of the rotation element and including a shaft ring and a race supporting the rotation element; and a spring retainer cover including an external circumferential portion connected to the race of the thrust ball bearing to fix the thrust ball bearing and a center portion connected to the first elastic element to support the first elastic element.

The present disclosure utilizes the above technical solutions and has the following advantageous effects.

The pedal reaction simulator according to the exemplary embodiment of the present disclosure may adjust the pedal reaction curve by adjusting the shape of the sliding groove of the rotation element according to the user demand, implementing different pedal feeling trends.

Furthermore, the pedal reaction simulator for the vehicle according to the exemplary embodiment of the present disclosure may adjust the soft or hard feeling of the pedal by changing the preload of the elasticity element of the adjustment device in accordance with the user's preference, customizing the pedal feeling.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
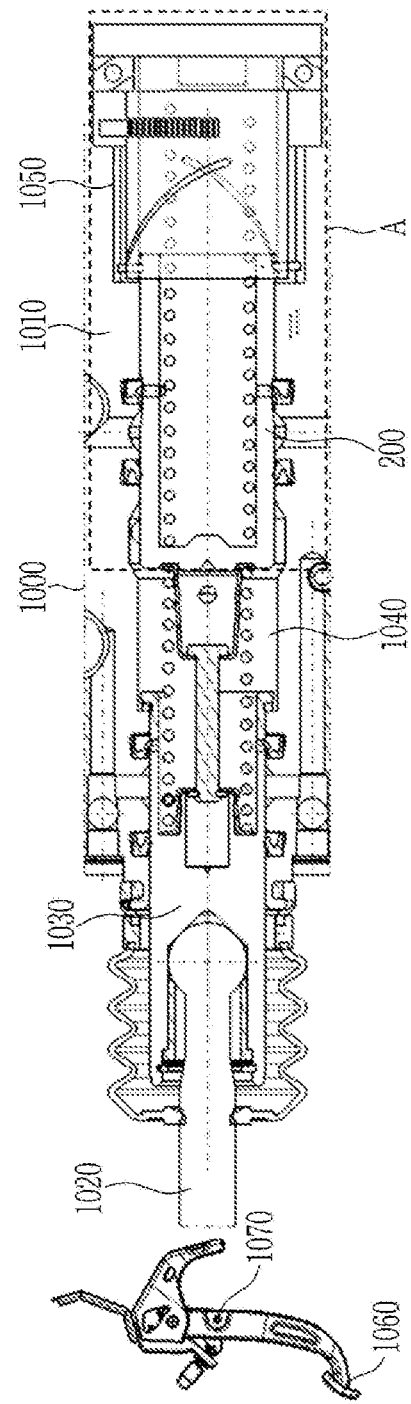
FIG. 1 is a schematic diagram illustrating a pedal reaction simulator for a vehicle according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail, the exemplary embodiments are implemented under the premise of the technical solution of the present disclosure, and the detailed embodiments and specific operation procedures are shown, but the protection scope of the present disclosure is not limited by the following embodiment.

Figure 2:
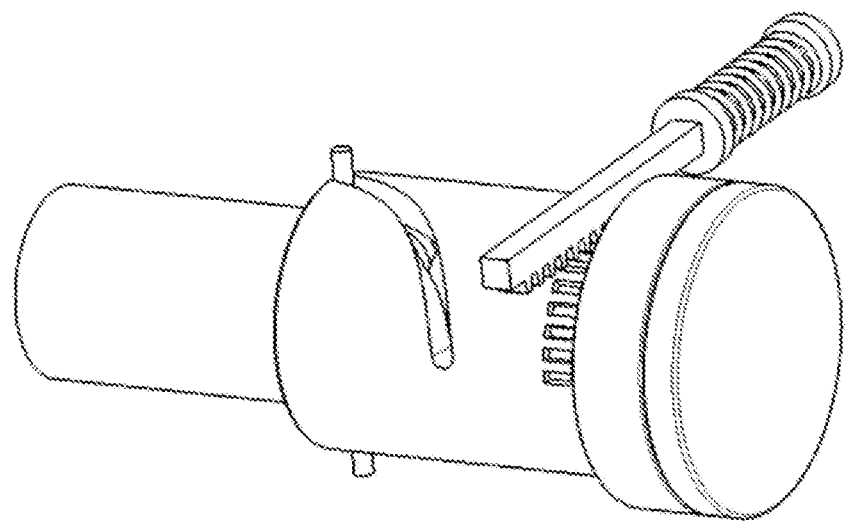
FIG. 2 is a schematic perspective view of a dotted line portion an in FIG. 1.
Figure 3:
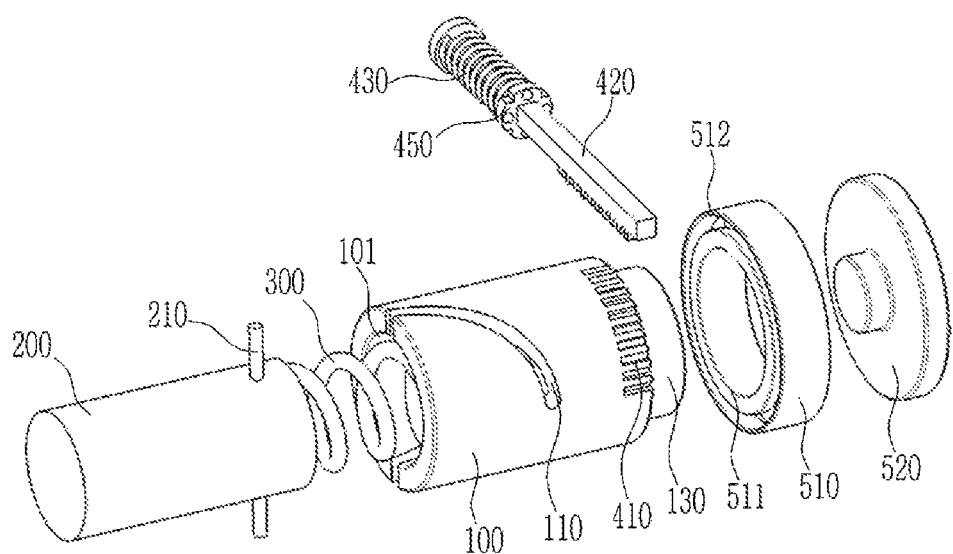
FIG. 3 is an exploded schematic diagram of a pedal reaction simulator for a vehicle according to various exemplary embodiments of the present disclosure.

FIG. 1 is a schematic diagram illustrating a pedal reaction simulator for a vehicle according to various exemplary embodiments of the present disclosure; FIG. 2 is a schematic perspective view of a dotted line portion an in FIG. 1; and FIG. 3 is an exploded schematic diagram of the pedal reaction simulator for the vehicle according to the various exemplary embodiments of the present disclosure.

Referring to FIG. 1, a pedal rod 1020 may be connected to a pedal 1060 through a connection point 1070 to receive a pedal force applied when a user steps on the pedal, and the pedal force may be transferred to a first stage piston 1030 through the pedal rod 1020. During braking, a brake fluid of a first stage chamber 1040 is sealed by a solenoid valve, and the pedal force of the first stage piston 1030 is firmly transferred to a second stage piston 200.

The pedal reaction simulator for the vehicle according to the various exemplary embodiments of the present disclosure may include a cylinder 1000, a rotation element 100, the piston 200, a first elastic element 300, a rotation resistance device, and an adjustment device. The cylinder 1000 may be filled with the brake fluid. The piston 200, the rotation element 100, and the rotation resistance device may be provided in the cylinder 1000.

The cylinder 1000 may provide a first accommodation space 1010, and the rotation element 100 may be rotatably disposed in the first accommodation space 1010. The rotation element 100 may provide a second accommodation space 101, and at least one sliding groove 110 of a predetermined shape penetrating the second accommodation space 101 may be formed on an external circumferential wall of the rotation element 100. The piston 200 may include at least one sliding guide member 210 corresponding to the sliding groove 110, and the piston 200 is inserted into the second accommodation space 101 through a first end portion of the rotation element 100 and is movable in the second accommodation space 101. The at least one sliding guide member 210 may be mounted in the corresponding sliding groove 110 and slide along the sliding groove 110 of the rotation element 100. The first elastic element 300 may be disposed in the second accommodation space 101 to elastically support the piston 200. The rotation resistance device may be provided in the cylinder 1000 and include a second elastic element 430 to provide a resistance to the rotation of the rotation element 100. The adjustment device may be configured to adjust a preload of the second elastic element 430 and provided in the cylinder 1000.

Figure 4:
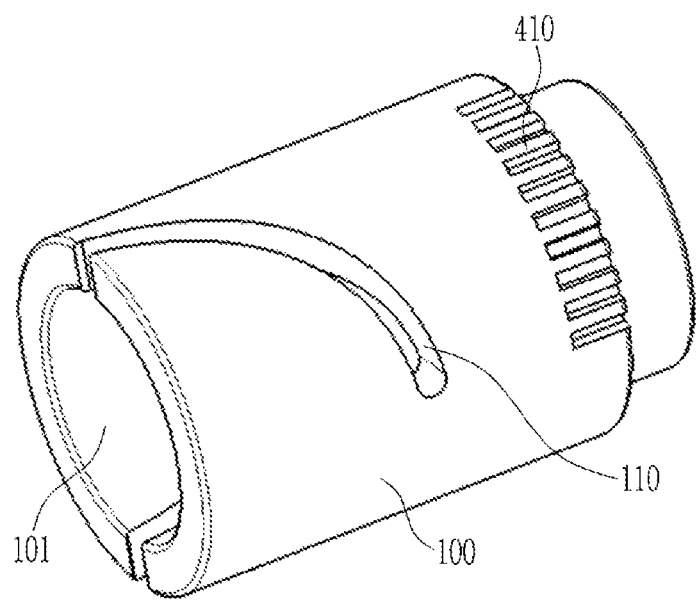
FIG. 4 is a schematic diagram of a rotation element of a pedal reaction simulator for a vehicle according to various exemplary embodiments of the present disclosure.

FIG. 4 is a schematic diagram of the rotation element of the pedal reaction simulator for the vehicle according to the various exemplary embodiments of the present disclosure. The rotation element 100 may be formed in a shape of cylinder with both end portions opened, and the second accommodation space 101 for accommodating the piston 200 and the first elastic element 300 may be provided in the rotation element 100. The rotation element 100 may rotate in the cylinder 1000 filled with a brake fluid. The sliding groove 110 extends from an opening of a first end portion of the rotation element 100 along the external circumferential wall of the rotation element 100 toward a second end portion of the rotation element 100 in a specific shape. The number of the sliding grooves 110 may be determined according to the need of a user, but the at least one sliding groove 110 is formed on the external circumferential wall of the rotation element 100. In an exemplary embodiment of the present disclosure, the two sliding grooves 110 symmetrical to each other may be formed on the external circumferential wall of the rotation element 100.

Figure 5:
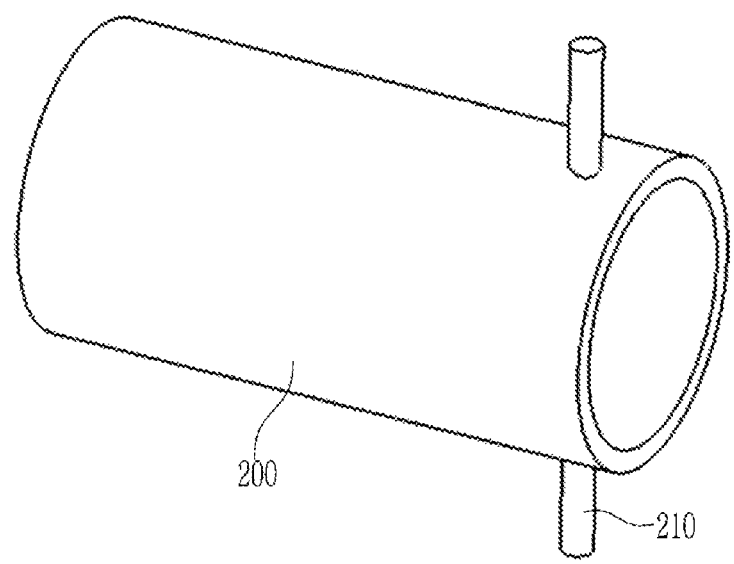
FIG. 5 is a schematic diagram of a piston of a pedal reaction simulator for a vehicle according to various exemplary embodiments of the present disclosure.

FIG. 5 is a schematic diagram of the piston of the pedal reaction simulator for the vehicle according to the various exemplary embodiments of the present disclosure. The sliding guide member 210 may be provided on an external circumferential wall of the piston 200. The sliding guide member 210 may be fixed on the external circumferential wall of the piston 200 or integrally formed with the piston 200. The number of the sliding guide members 210 may be adjusted according to the need of a user, but the at least one sliding guide member 210 is provided on the external circumferential wall of the piston 200. The locations and the number of the sliding guide members 210 correspond to the locations and the number of the sliding grooves 110 on the rotation element 100.

A concave groove 1050 may be formed in an internal wall of the cylinder 1000. An upper portion of the sliding guide member 210 of the piston 200 is slidable along the concave groove 1050 of the cylinder 1000. When the upper portion of the sliding guide member 210 of the piston 200 moves along the concave groove 1050 of the cylinder 1000 in a first direction (right side in FIG. 3), a middle portion and/or a lower portion of the sliding guide member 210 may be inserted into an entrance of the sliding groove 110. Therefore, the sliding guide member 210 is slidable in the first direction along the sliding groove 110 so that the piston 200 may move from the first end portion of the rotation element 100 to the second accommodation space 101 of the rotation element 100.

In an exemplary embodiment of the present disclosure, the two sliding guide members 210 respectively corresponding to the two sliding grooves 110 may be provided on the external circumferential wall of the piston 200. The upper portion of the sliding guide member 210 is located in the cylinder 1000, and the rotation of the sliding guide member 210 is limited by the concave groove 1050 of the cylinder 1000. Therefore, the piston 200 itself including the sliding guide member 210 may not rotate and may only move in the first direction along the concave groove 1050 of the cylinder 1000. The middle portion and/or the lower portion of the sliding guide member 210 is inserted into the entrance of the sliding groove 110, and when the piston 200 moves linearly along the cylinder 1000, the rotation element 100 rotates by the sliding guide member 210 inserted into the sliding groove 110 and moving linearly in the sliding groove 110. In an exemplary embodiment of the present disclosure, when the piston 200 moves in the first direction, the rotation element 100 may rotate in a counterclockwise direction (when viewed from the first direction).

Figure 6:
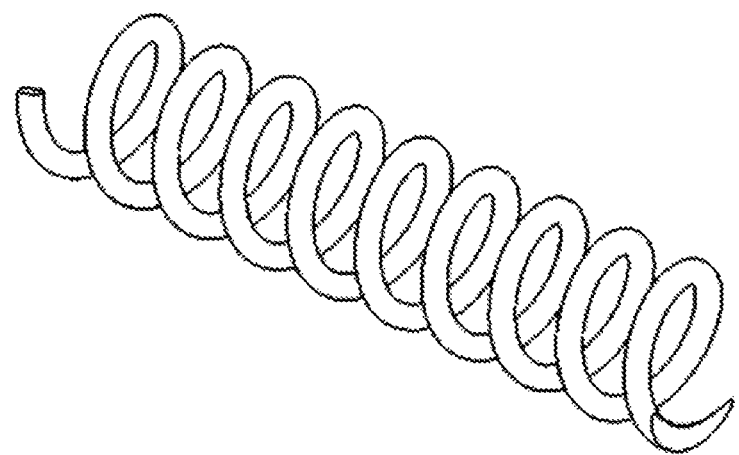
FIG. 6 is a schematic diagram of a first elastic element of a pedal reaction simulator for a vehicle according to various exemplary embodiments of the present disclosure.

FIG. 6 is a schematic diagram of the first elastic element of the pedal reaction simulator for the vehicle according to the various exemplary embodiments of the present disclosure. The first elastic element 300 may be disposed in the second accommodation space 101 of the rotation element 100, and the first elastic element 300 may be a coil spring. One end portion of the first elastic element 300 may be connected to the piston 200, and the other end portion may be supported to provide an elastic restoring force to the piston 200. When an external force is applied to the piston 200 in the first direction, the piston 200 may move to the second accommodation space 101 of the rotation element 100, and the first elastic element 300 may be compressed by the piston 200. When the external force applied to the piston 200 is released, the piston 200 may move to an outside of the second accommodation space 101 of the rotation element 100 by the elastic restoring force of the first elastic element 300 and return to an initial state.

Figure 7:
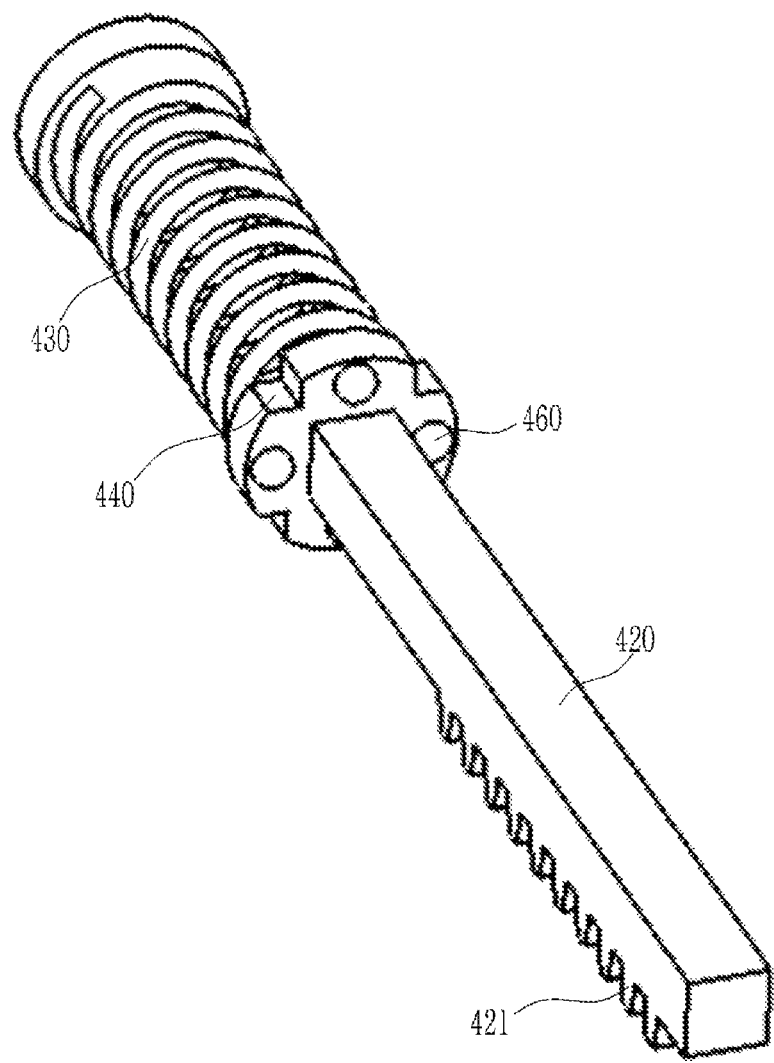
FIG. 7 is a schematic diagram illustrating a portion of a rotation resistance device of a pedal reaction simulator for a vehicle according to various exemplary embodiments of the present disclosure.

FIG. 7 is a schematic diagram illustrating a portion of the rotation resistance device of the pedal reaction simulator for the vehicle according to the various exemplary embodiments of the present disclosure. In the pedal reaction simulator for the vehicle according to the various exemplary embodiments of the present disclosure, the rotation resistance device may be mounted in the cylinder 1000, and include tooth portions 410, a rack member 420, and the second elastic element 430. The tooth portion 410 may be provided on an external circumferential wall of the second end portion of the rotation element 100. One end portion of the rack member 420 may be engaged with the tooth portion 410 and the other end portion may be connected to the second elastic element 430. As the rack member 420 moves linearly by the rotation of the rotation element 100, the second elastic element 430 may be deformed to provide resistance to the rotation of the rotation element 100.

The tooth portion 410 may be provided to correspond to the sliding groove 110 along the external circumferential wall of the second end portion of the rotation element 100. In an exemplary embodiment of the present disclosure, in a circumferential direction of the rotation element 100, a start point of the tooth portion 410 on the external circumferential wall of the second end portion of the rotation element 100 may correspond to a start point of the sliding groove 110 on an external circumferential wall of the first end portion of the rotation element 100, and an end point of the tooth portion 410 on the external circumferential wall of the second end portion of the rotation element 100 may correspond to an end point of the sliding groove 110 on the external circumferential wall of the rotation element 100. Therefore, when the sliding guide member 210 of the piston 200 slides along the sliding groove 110 of the rotation element 100, a rotation angle of the rotation element 100 is the same as a central angle between the start point and the end point of the tooth portion 410 formed along the external circumferential wall of the second end portion of the rotation element 100. However, the present disclosure is not limited to the above description, and the tooth portion 410 may be shaped according to the need of a user.

As shown in FIG. 7, in the pedal reaction simulator for the vehicle according to an exemplary embodiment of the present disclosure, the rack member 420 may be a rectangular parallelepiped, but the present disclosure is not limited thereto. For example, the rack member 420 may include a shape of cylinder or a long strip shape including an arc-shaped cross section. Tooth portions 421 may be provided in one end portion of the rack member 420, and engaged with the tooth portions 410 of the rotation element 100. When the rotation element 100 rotates, the rack member 420 engaged with the tooth portion 410 may move according to the rotation of the rotation element 100. In the pedal reaction simulator for the vehicle according to an exemplary embodiment of the present disclosure, because the rack member 420 includes a rectangular paralleletubed shape, when the rotation element 100 rotates, the rack member 420 engaged with the tooth portion 410 may move linearly. That is, the rotation motion of the rotation element 100 may be converted into the linear motion of the rack member 420.

The other end portion of the rack member 420 may be connected to the second elastic element 430, and one end portion of the second elastic element 430 which is not connected to the rack member 420 may be supported by the adjustment device. When the rotation element 100 rotates in the counterclockwise direction (viewed from the first direction), the rack member 420 engaged with the tooth portion 410 moves linearly and presses the second elastic element 430 so that the second elastic element 430 may be elastically deformed. The second elastic element 430 may be compressed to generate an elastic force. That is, the second elastic element 430 may be configured to generate the elastic restoring force pushing the rack member 420. Because the tooth portions 421 of the rack member 420 are engaged with the tooth portions 410 of the rotation element 100, the rack member 420 may be configured to generate a force that pushes the rotation element 100 to rotate in a clockwise direction (when viewed from the first direction) and provide the resistance with respect to the rotation of the rotation element 100 in the counterclockwise direction to the rotation element 100.

The rotation resistance device may further include a position limiting sheet 450. The position limiting sheet 450 may be provided between the rack member 420 and the second elastic element 430, and operatively connects the rack member 420 to the second elastic element 430. The position limiting sheet 450 may be integrally formed with the rack member 420.

In the pedal reaction simulator for the vehicle according to an exemplary embodiment of the present disclosure, the adjustment device may be provided in the cylinder 1000. The second elastic element 430 may be a spring, and the adjustment device may be connected to the spring and adjust the preload of the spring.

Figure 8:
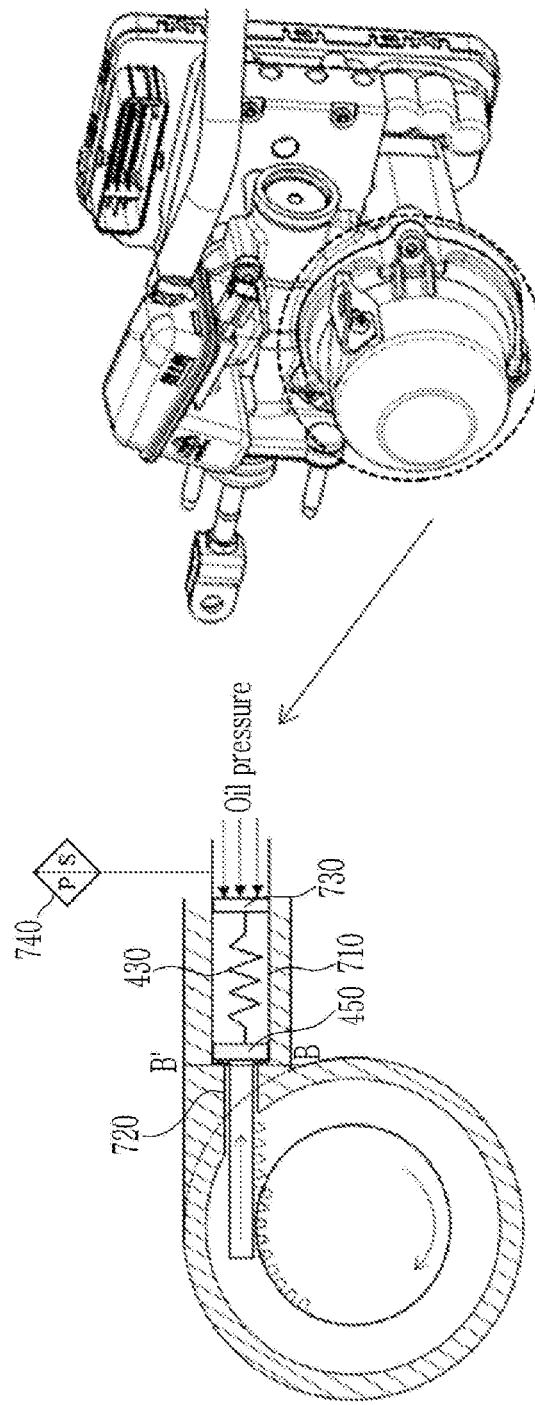
FIG. 8 is a schematic diagram of an adjustment device of a pedal reaction simulator for a vehicle according to various exemplary embodiments of the present disclosure.
Figure 9:
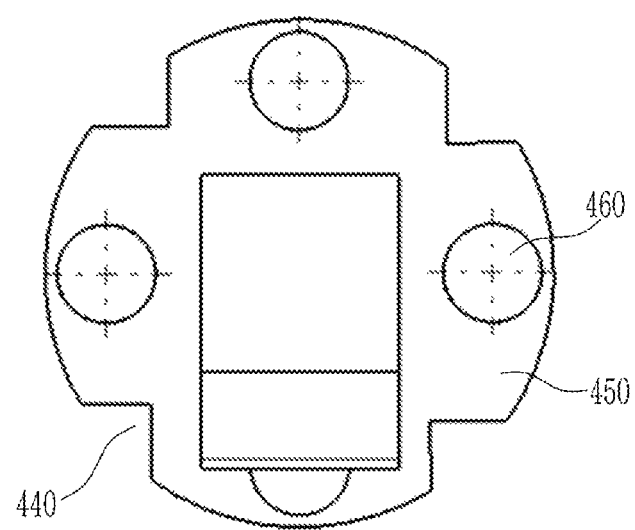
FIG. 9 is a front view of FIG. 7.

FIG. 8 is a schematic diagram of the adjustment device of the pedal reaction simulator for the vehicle according to the various exemplary embodiments of the present disclosure; and FIG. 9 is a front view of the adjustment device of the pedal reaction simulator for the vehicle according to the various exemplary embodiments of the present disclosure of FIG. 7.

The adjustment device may include an adjustment tube 710, a connection tube 720, and a piston sheet 730. The adjustment tube 710 may include a first tube diameter and may be provided to be connected to the first accommodation space 1010 of the cylinder 1000 in a tangential direction of the rotation element 100. The adjustment tube 710 may provide an adjustment space for accommodating the second elastic element 430 and the position limiting sheet 450. The connection tube 720 may include a second tube diameter and is located between the adjustment space of the adjustment tube 710 and the first accommodation space 1010 of the cylinder 1000. The connection tube 720 provides a connection space for accommodating the rack member 420. Accordingly, the rack member 420 may enter the first accommodation space 1010 of the cylinder 1000 through the connection space. The rack member 420 entering the first accommodation space 1010 of the cylinder 1000 may be engaged with the tooth portion 410 on the rotation element 100. The piston sheet 730 may be mounted in the adjustment space of the adjustment tube 710 and connected to the second elastic element 430. The position limiting sheet 450 and the piston sheet 730 are movable in the adjustment space of the adjustment tube 710, and the second elastic element 430 may be disposed between the position limiting sheet 450 and the piston sheet 730. A pressure adjustment oil may be filled in the adjustment tube 710 on the opposite side of the cylinder 1000 with respect to the piston sheet 730. The pressure adjustment oil may apply pressure to the piston sheet 730 toward the second elastic element 430. Accordingly, the preload of the second elastic element 430 may be adjusted by adjusting the pressure of the pressure adjustment oil in the adjustment tube 710. The second tube diameter of the connection tube 720 may be smaller than the first tube diameter of the adjustment tube 710, preventing the position limiting sheet 450 of the adjustment tube 710 from entering the connection tube 720.

The adjustment tube 710 may be connected to the connection tube 720 at a dotted line B-B' in FIG. 8 and connected to the first accommodation space 1010 of the cylinder 1000 through the connection tube 720. In the pedal reaction simulator for the vehicle according to an exemplary embodiment of the present disclosure, the adjustment tube 710) may be integrally formed with the connection tube 720 and the cylinder 1000, and the first tube diameter of the adjustment tube 710 may be greater than the second tube diameter of the connection tube 720.

A notch 440 is formed in the position limiting sheet 450, so that the brake fluid in the cylinder 1000 may flow to the adjustment tube 710 through the connection tube 720 and the notch 440 of the position limiting sheet 450. The brake fluid in the adjustment tube 710 may apply pressure to the piston sheet 730 that opposes the pressure adjustment oil. In an exemplary embodiment of the present disclosure, four notches may be uniformly formed with respect to a peripheral edge portion of the position limiting sheet 450, but the present disclosure is not limited thereto.

Additionally, protrusions 460 may be formed on the position limiting sheet 450. The protrusions 460 may allow the position limiting sheet 450 to be spaced from the connection tube 720 by at least a certain distance in the adjustment tube 710, so that the brake fluid of the cylinder 1000 may be at least partially introduced into the adjustment tube 710. In an exemplary embodiment of the present disclosure, the four protrusions 460 may be formed in the same shape along an external circumferential portion of the position limiting sheet 450, but the present disclosure is not limited thereto.

One side (a right side of the piston sheet 730 in FIG. 8) of the adjustment tube 710 with respect to the piston sheet 730 may be filled with the pressure adjustment oil. A distance between the piston sheet 730 and the position limiting sheet 450 (i.e., a length of the second elastic element 430) may be adjusted by adjusting the pressure of the pressure regulating oil in the adjustment tube 710, adjusting the preload of the spring. In an exemplary embodiment of the present disclosure, the pressure adjustment oil on one side of the adjustment tube 710 with respect to the piston sheet 730 may be the brake fluid, and the brake fluid in the adjustment tube 710 may be fluidly communicated to a hydraulic module of a vehicle braking system. The preload of the second elastic element 430 may be adjusted by adjusting the pressure of the brake fluid in the adjustment tube 710 by a motor and a solenoid valve. However, the present disclosure is not limited to those described above, and the external force may be applied to the piston sheet 730 in the adjustment tube 710 in various ways such as pneumatic, electric, or manual way.

When the pressure of the pressure adjustment oil in the adjustment tube 710 is high, the piston sheet 730) applies a relatively large pressure to the second elastic element 430. In the instant case, an amount of movement of the piston sheet 730 toward the position limiting sheet 450 is large, and accordingly, a degree of compression of the second elastic element 430 is relatively large. When the pressure of the pressure adjustment oil in the adjustment tube 710 is low; the piston sheet 730 applies a relatively small pressure to the second elastic element 430. In the instant case, the amount of movement of the piston sheet 730 toward the position limiting sheet 450 is small, and accordingly, the degree of compression of the second elastic element 430 is relatively small, or even the second elastic element 430 may not be compressed. Usually, when the rotation element 100 does not rotate, the rack member 420 does not push the position limiting sheet 450 toward the piston sheet 730. In the instant state, by the elastic force of the second elastic element 430, the position limiting sheet 450 may be located at a portion where the connection tube 720 and the adjustment tube 710 meet. Therefore, the preload of the second elastic element 430 may be adjusted by adjusting the pressure of the pressure adjustment oil in the adjustment tube 710. When the pressure of the pressure adjustment oil in the adjustment tube 710 is high, the rotation of the rotation element 100 may be relatively strongly resisted because the preload of the second elastic element 430 is large. In contrast, when the pressure of the pressure adjustment oil in the adjustment tube 710 is low; the rotation of the rotation element 100 may be relatively weakly resisted because the preload of the second elastic element 430 is small.

In an exemplary embodiment of the present disclosure, the adjustment device may further include a pressure sensor 740. The pressure sensor 740 may be provided in one side of the adjustment tube 710 with respect to the piston sheet 730 and may detect the pressure of the pressure adjustment oil in the adjustment tube 710. In an exemplary embodiment of the present disclosure, the pressure sensor 740 may be a hydraulic pressure sensor, but the present disclosure is not limited thereto. For example, a displacement sensor or the like may be used as the pressure sensor 740.

Furthermore, because the second tube diameter of the connection tube 720 is smaller than the first tube diameter of the adjustment tube 710, the connection tube 720 may limit the movement of the position limiting sheet 450 by the elastic force of the second elastic element 430. That is, the relatively small tube diameter of the connection tube 720 may prevent the position limiting sheet 450 from moving into the connection tube 720 by the elastic force of the second elastic element 430, and furthermore, may prevent the position limiting sheet 450 from moving into the first accommodation space 1010 of the cylinder 1000. Therefore, a user may safely adjust the preload of the second elastic element 430.

Figure 10:
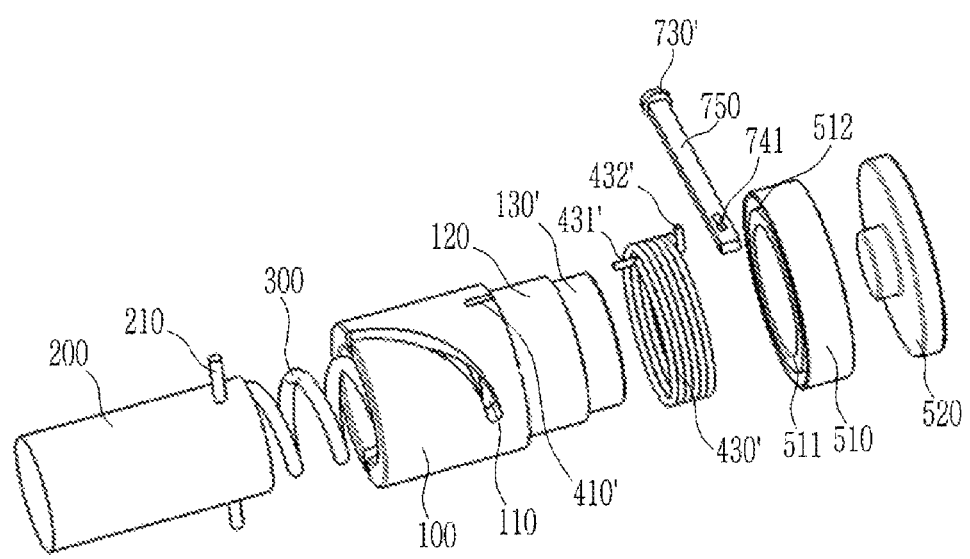
FIG. 10 is an exploded schematic diagram of a pedal reaction simulator for a vehicle according to various exemplary embodiments of the present disclosure.

FIG. 10 is an exploded schematic diagram of the pedal reaction simulator for the vehicle according to various exemplary embodiments of the present disclosure. In the various exemplary embodiments of the present disclosure, the rotation resistance device may include a locking groove 410', and the locking groove 410' may be formed on the external circumferential wall of the second end portion of the rotation element 100. One end portion of the second elastic element 430' may be coupled to the locking groove 410', and the other end portion of the second elastic element 430' may be fixed or coupled to the adjustment device. When the rotation element 100 rotates, the second elastic element 430' may be elastically deformed to provide the resistance to the rotation of the rotation element 100.

The second elastic element 430' may be a torsion spring or a coil spring. In the various exemplary embodiments of the present disclosure, the second elastic element 430' may be a torsion spring. As shown in FIG. 10, one end portion of the torsion spring extends in a direction parallel to an axial direction of the torsion spring, that is, in a second direction (a left side of FIG. 10) to form a locking portion 431' of the torsion spring. The other end portion of the torsion spring extends outward in a direction perpendicular to a circumferential direction of the torsion spring, that is, in a radial direction of the torsion spring, to form an adjustment portion 432' of the torsion spring.

The second end portion of the rotation element 100 may extend in the first direction (a right side of FIG. 10) to form a mounting portion 120. An external diameter of the mounting portion 120 may be smaller than an external diameter of the rotation element 100 and smaller than an internal diameter of the torsion spring so that the torsion spring may be mounted on the mounting portion 120. Therefore, the locking portion 431' of the torsion spring may be easily inserted into the locking groove 410' on the rotation element 100. In one example, when the torsion spring is mounted on the mounting portion 120, and the locking portion 431' of the torsion spring is inserted into the locking groove 410' on the rotation element 100, the length of the mounting portion 120 in the axial direction may be the same as the length of the torsion spring (not including the locking portion 431') in the axial length.

The adjustment device may further include a push rod 750 and an actuator 760 (see FIG. 8). One end portion of the push rod 750 may be connected to a torsion spring or coil spring, and the actuator 760 may be connected to the other end portion of the push rod 750. The actuator 760 may push or pull the push rod 750 to adjust the preload of the torsion spring or the coil spring.

In an exemplary embodiment of the present disclosure, the actuator 760 may be electrically connected to a controller including a processor which may include a series of commands for carrying out the method disclosed in the aforementioned various exemplary embodiments of the present disclosure.

The push rod 750 may be a rectangular paralleletubed, but the present disclosure is not limited thereto. For example, the push rod 750 may be cylindrical or may be in a form of a long strip including an arc-shaped cross section. An adjustment hole 741 may be formed in one end portion of the push rod 750, and the adjustment portion 432' of the torsion spring may be coupled into the adjustment hole 741. The other end portion of the push rod 750 is fixable or adjustable, so that when the rotation element 100 rotates, the torsion spring coupled to the locking groove 410' of the rotation element 100 may be twisted and provide the resistance to the rotation of the rotation element 100.

When the rotation element 100 rotates in the counterclockwise direction (when viewed from the first direction), the torsion spring coupled to the locking groove 410' is twisted and elastically deformed. That is, the torsion spring may generate the elastic restoring force that rotates the rotation element 100 in the clockwise direction (when viewed from the first direction), and provide the resistance to the rotation of the rotation element 100 in the counterclockwise direction thereof.

The actuator 760 may be a pneumatic actuator, a hydraulic actuator, an electric actuator, or a mechanical actuator, but is not limited thereto. In the various exemplary embodiments of the present disclosure, when the actuator 760 pushes the push rod 750 to rotate the torsion spring in the clockwise direction (viewed from the first direction), the preload of the torsion spring increases. In contrast, when the actuator 760 pulls the push rod 750 to rotate the torsion spring in the counterclockwise direction (viewed from the first direction), the preload of the torsion spring decreases.

The adjustment device of the various exemplary embodiments of the present disclosure in FIG. 10 may be provided in a manner similar to the adjustment device of the various exemplary embodiments of the present disclosure in FIG. 3. For example, in the various exemplary embodiments of the present disclosure, the piston sheet 730' may be provided on one end portion of the push rod 750 which is not connected to the torsion spring and may be disposed in the adjustment tube 710 filled with the pressure adjustment oil. The pressure adjustment oil may be a brake fluid, and the adjustment tube 710 may fluidly communicate with a hydraulic module of a vehicle braking system. Therefore, the pressure of the brake fluid in the adjustment tube 710 may be adjusted by a motor and a solenoid valve.

Figure 11:
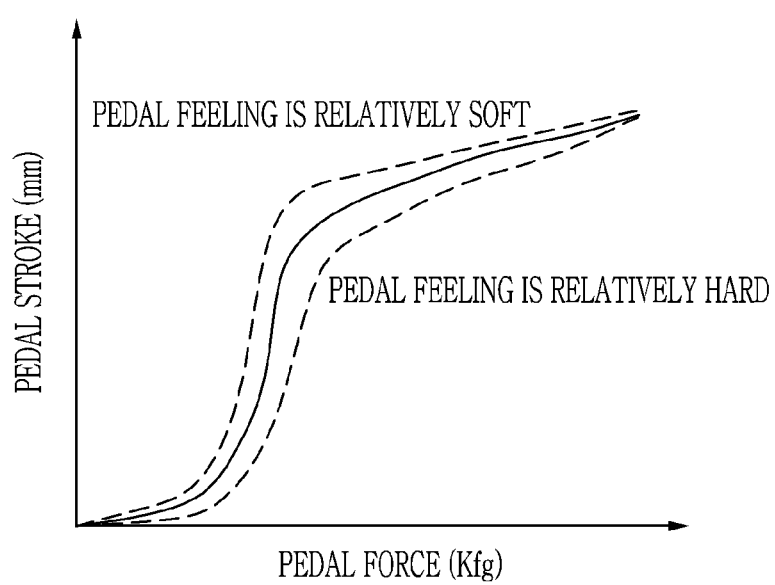
FIG. 11 is a schematic diagram of a curve in which a pedal feeling of a pedal reaction simulator for a vehicle according to an exemplary embodiment of the present disclosure changes according to a pedal force and a pedal stroke.

Hereinafter, a process of adjusting a pedal feeling will be described in detail with reference to FIG. 11. FIG. 11 is a schematic diagram of a curve in which a pedal feeling of the pedal reaction simulator for the vehicle according to an exemplary embodiment of the present disclosure changes according to a pedal force and a pedal stroke. In FIG. 11, a horizontal axis represents the pedal force applied by a user to the pedal, a vertical axis represents the pedal stroke, and a solid line represents a trend curve of the pedal force and the pedal stroke when a user steps on the pedal. The curve may be complexly determined by the shape of the sliding groove 110 of the rotation element 100, the preload of the first elastic element 300, and the preload of the second elastic element 430 or 430'. The shape of the sliding groove 110 prepares a basis for the trend curve of various pedal feelings. Two dotted lines in FIG. 11 may represent a soft pedal feeling and a hard pedal feeling when a user steps on the pedal, respectively. In FIG. 11, a left dotted line represents a relatively soft pedal feeling, and a right dotted line represents a relatively hard pedal feeling.

Figure 14:
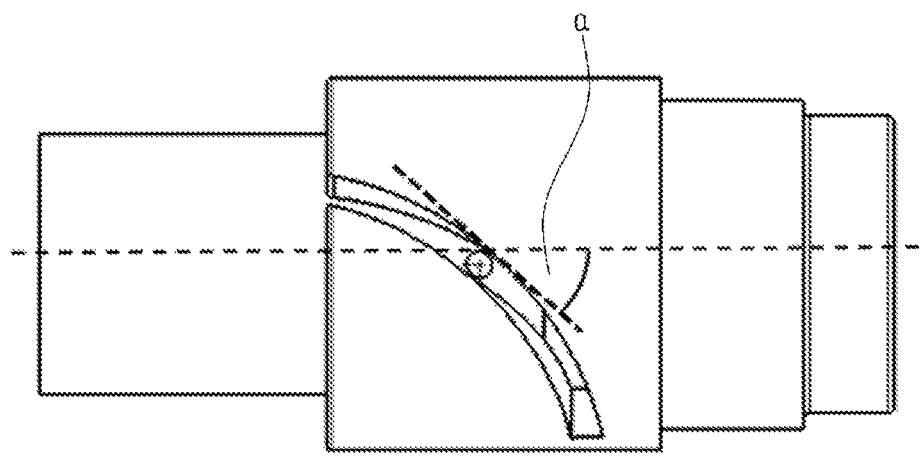
FIG. 14 is a schematic diagram of a relationship between a shape of a sliding groove and a pedal feeling curve according to an exemplary embodiment of the present disclosure.

FIG. 14 is a schematic diagram of a relationship between the shape of the sliding groove and the pedal feeling curve according to an exemplary embodiment of the present disclosure. Hereinafter, the effect of the shape of the sliding groove 110, the preload of the first elastic element 300, and the preload of the second elastic element 430 or 430' on the pedal feeling curve will be described in detail. In an exemplary embodiment of the present disclosure, when a user steps on the pedal, the piston 200 slides in the first direction, and the sliding guide member 210 on the piston 200 slides from the entrance of the sliding groove 110 of the rotation element 100 in the first direction along the sliding groove 110. When the piston 200 moves in the second accommodation space 101 of the rotation element 100, the movement of the piston 200 is affected by not only the force of a user stepping on the pedal but also the resistance of the sliding groove 110 of the rotation element 100 and an elastic restoring force of the first elastic element 300. The shape of the sliding groove 110 may be adjusted according to the need of a user. As shown in FIG. 14, the trend of the pedal feeling curve may be determined by an angle α between an instantaneous movement direction of the sliding guide member 210 with respect to the sliding groove 110 and the axial direction of the piston 200. In other words, the angle α between the instantaneous movement direction of the sliding guide member 210 with respect to the sliding groove 110 and the axial direction of the piston 200 may be adjusted by adjusting the shape of the sliding groove 110, and accordingly, the trend of the pedal feeling curve may be adjusted.

When the piston 200 moves in the first direction in the second accommodation space 101 of the rotation element 100, the rotation element 100 rotates in the counterclockwise direction by the sliding groove 110 and the sliding guide member 210. Accordingly, in the various exemplary embodiments of the present disclosure, because the tooth portions 421 on the rack member 420 are engaged with the tooth portions 410 on the rotation element 100, the rack member 420 is pushed toward the second elastic element 430 to compress the second elastic element 430. At the instant time, when a user prefers the hard pedal feeling, the preload of the second elastic element 430 of the rotation resistance device is increased by increasing the pressure of the adjustment device. Therefore, because the second elastic element 430 provides a relatively large resistance to the rotation element 100, the relatively hard pedal feeling may be implemented. When the user prefers the relatively soft pedal feeling, the preload of the second elastic element 430 of the rotation resistance device is reduced by reducing the pressure of the adjustment device. Therefore, because the second elastic element 430 provides the relatively small resistance to the rotation element 100, the relatively soft pedal feeling may be implemented.

In the various exemplary embodiments of the present disclosure, when the rotation element 100 rotates in the counterclockwise direction, because the locking portion 431' of the second elastic element 430' is inserted into the locking groove 410' on the rotation element 100, the second elastic element 430' is firmly tightened. At the instant time, when the user prefers the relatively hard pedal feeling, the preload of the second elastic element 430' of the rotation resistance device is increased by increasing the pressure of the adjustment device. Therefore, because the second elastic element 430' provides the relatively large resistance to the rotation element 100, the relatively hard pedal feeling may be implemented. When the user prefers the relatively soft pedal feeling, the preload of the second elastic element 430' of the rotation resistance device is reduced by reducing the pressure of the adjustment device. Therefore, because the second elastic element 430' provides the relatively small resistance to the rotation element 100, the relatively soft pedal feeling may be implemented.

In an exemplary embodiment of the present disclosure, a vehicle supplier may obtain a trend curve of pedal feeling preferred by consumers through means such as a market research, and according to the trend curve of pedal feeling, the sliding groove 110 on the rotation element 100 may be determined. Additionally, it is possible to allow the hydraulic pressure of the pressure adjustment oil of the adjustment device to correspond to a degree of softness or hardness of the pedal feeling, and the present correspondence relationship may be displayed to the user through an audio video navigation and telemetric (AVNT) system. For safety; the user may select an exemplary pedal feeling through the AVNT system while parked, and an integrated electric booster (IEB) may automatically supply a certain level of the hydraulic pressure of the pressure adjustment oil according to a user's selection to implement the pedal feeling required by the user.

Figure 12:
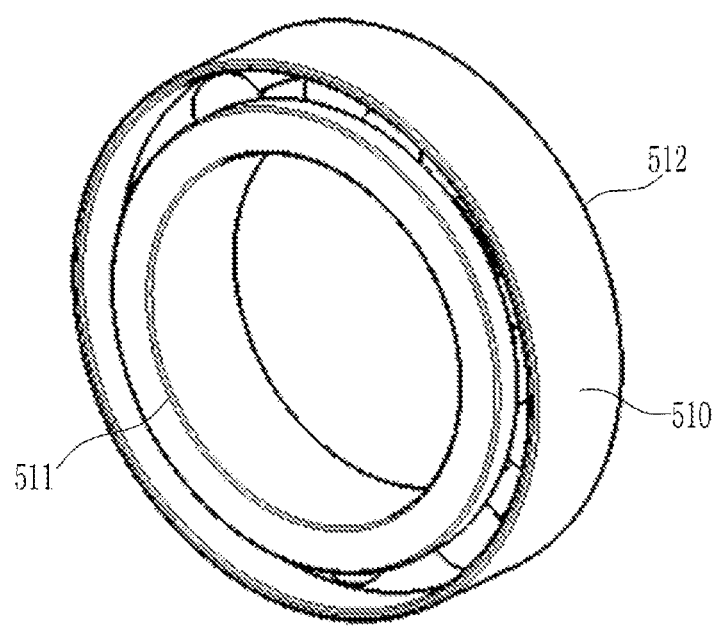
FIG. 12 is a schematic diagram of a thrust ball bearing of a pedal reaction simulator for a vehicle according to an exemplary embodiment of the present disclosure.

The pedal reaction simulator for the vehicle according to an exemplary embodiment of the present disclosure may further include a support assembly. The support assembly may be provided at the second end portion of the rotation element 100 to support the rotation element 100 and the first elastic element 300 provided inside the rotation element 100. FIG. 12 is a schematic diagram of a thrust ball bearing of the pedal reaction simulator for the vehicle according to an exemplary embodiment of the present disclosure; and FIG. 13 is a schematic diagram of a spring retainer cover of the pedal reaction simulator for the vehicle according to an exemplary embodiment of the present disclosure.

Figure 13:
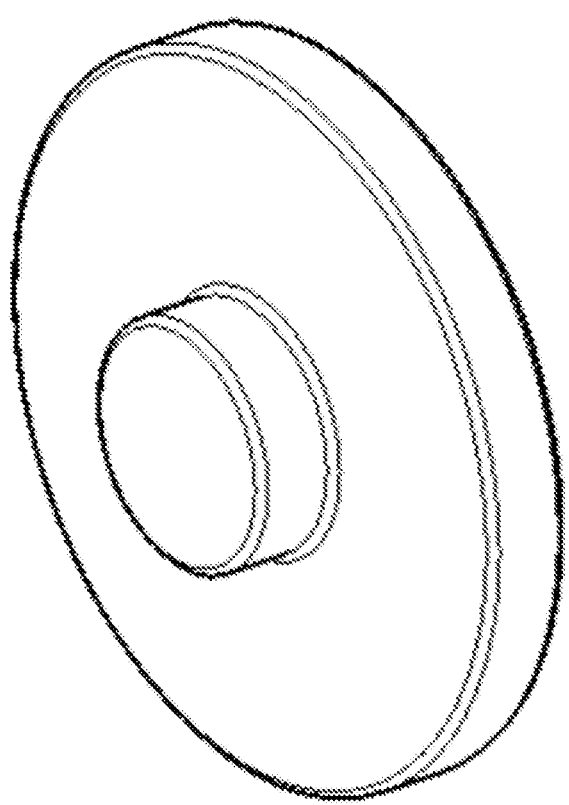
FIG. 13 is a schematic diagram of a spring retainer cover of a pedal reaction simulator for a vehicle according to an exemplary embodiment of the present disclosure.

As shown in FIGS. 10, 12, and 13, the support assembly may include a thrust ball bearing 510 and a spring retainer cover 520. The thrust ball bearing 510 may include a shaft ring 511 and a race 512. The shaft ring 511 may be connected to the second end portion of the rotation element 100 to support the rotation element 100, and the thrust ball bearing 510 may support the rotation element 100 in the axial and radial directions. Because the thrust ball bearing 510 receives a relatively large force in the axial direction, the thrust ball bearing 510 may mainly support the rotation element 100 in the axial direction thereof. An external circumferential portion of the spring retainer cover 520 may be connected to the race 512 of the thrust ball bearing 510 to fix the thrust ball bearing 510, and a center portion of the spring retainer cover 520 may be connected to the first elastic element 300 to support the first elastic element 300.

In the various exemplary embodiments of the present disclosure, as shown in FIG. 3, the second end portion of the rotation element 100 may extend to form a shaft diameter portion 130. To facilitate rotatably connecting the rotation element 100 to the thrust ball bearing 510 by mounting the shaft diameter portion 130 to the thrust ball bearing 510, an external diameter of the shaft diameter portion 130 may be smaller than an external diameter of the rotation element 100 and may be smaller than an internal diameter of the shaft ring 511 of the thrust ball bearing 510.

In the various exemplary embodiments of the present disclosure, as shown in FIG. 10, the second end portion of the rotation element 100 may extend to further form the shaft diameter portion 130'. To facilitate rotatably connecting the rotation element 100 to the thrust ball bearing 510 by mounting the shaft diameter portion 130' to the thrust ball bearing 510, the external diameter of the shaft diameter portion 130' may be smaller than an external diameter of the mounting portion 120 and may be smaller than the internal diameter of the shaft ring 511 of the thrust ball bearing 510.

The thrust ball bearing 510 may include the shaft ring 511, the race 512 and a ball retainer assembly. The shaft diameter portions 130 and 130' of the rotation element 100 may be coupled to the shaft ring 511 of the thrust ball bearing 510, and the race 512 of the thrust ball bearing 510 may be fixed. Accordingly, the thrust ball bearing 510 may support the rotation element 100 in the axial direction thereof and enable the rotation of the rotation element 100. In an exemplary embodiment of the present disclosure, the race 512 of the thrust ball bearing 510 may be coupled to the spring retainer cover 520 to fix the thrust ball bearing 510 through the spring retainer cover 520. The center portion of the spring retainer cover 520 may be connected to the first elastic element 300 to support the first elastic element 300. However, the present disclosure is not limited thereto, and the race 512 of the thrust ball bearing 510 may be directly coupled to the cylinder 1000, and the first elastic element 300 may be directly coupled to the cylinder 1000, and thus, the spring retainer cover 520 may be omitted.

As described above, the pedal reaction simulator for the vehicle of the present disclosure has design convenience. That is, the pedal reaction simulator for the vehicle of the present disclosure may easily implement different pedal reaction curves by adjusting the shape of the sliding groove of the rotation element according to a user demand, may include a simple structure and may be easily implemented.

Furthermore, the pedal reaction simulator for the vehicle according to an exemplary embodiment of the present disclosure may implement continuously and dynamically adjustable pedal feeling. That is, the pedal reaction simulator for the vehicle according to an exemplary embodiment of the present disclosure may dynamically and continuously adjust the degree of softness or hardness of the pedal feeling by adjusting the preload of the elastic element of the adjustment device according to the soft or hard pedal feeling exemplary by a user. Therefore, the pedal reaction simulator for the vehicle according to an exemplary embodiment of the present disclosure may implement different pedal feelings and have strong usability, and the pedal feeling may be easily adjusted.

The various embodiments of the present disclosure are not a complete list of all possible combinations, but are intended to illustrate representative aspects of the present disclosure, and the descriptions of various embodiments may be applied independently or in combination of two or more.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pedal reaction simulator apparatus for a vehicle, the pedal reaction simulator apparatus comprising:
   a cylinder providing a first accommodation space therein;
   a rotation element rotatably mounted in the first accommodation space, providing a second accommodation space therein, and including at least one sliding groove penetrating the second accommodation space and formed on an external circumferential wall of the rotation element;
   a piston including at least one sliding guide member corresponding to the at least one sliding groove and movably provided in the second accommodation space through a first end portion of the rotation element;
   a first elastic element mounted in the second accommodation space to elastically support the piston;
   a rotation resistance device provided in the cylinder, coupled to the rotation element, including a second elastic element, and configured to provide a resistance to a rotation of the rotation element; and
   an adjustment device provided on the cylinder, engaged to the second elastic element, and configured to adjust a preload of the second elastic element,
   wherein the at least one sliding guide member is slidably mounted in a corresponding sliding groove.

2. The pedal reaction simulator apparatus of claim 1, wherein a concave groove is formed in the cylinder, and wherein a portion of the at least one sliding guide member slides along the concave groove, and another portion of the at least one sliding guide member slides along the at least one sliding groove so that in response that the piston moves along the cylinder, the rotation element rotates through the at least one sliding groove and the at least one sliding guide member.

3. The pedal reaction simulator apparatus of claim 2, wherein the rotation resistance device includes:
   a tooth portion provided on an external circumferential wall of a second end portion of the rotation element; and
   a rack member including a first end portion engaged with the tooth portion and a second end portion connected to the second elastic element to provide a resistance to the rotation of the rotation element through an elastic deformation of the second elastic element due to the rotation of the rotation element.

4. The pedal reaction simulator apparatus of claim 3, wherein the rotation resistance device further includes a position limiting sheet provided between the rack member and the second elastic element,
   wherein the second elastic element is a spring, and
   wherein the adjustment device is engaged to the spring and configured to adjust the preload of the spring.

5. The pedal reaction simulator apparatus of claim 4, wherein the adjustment device includes:
   an adjustment tube in which the spring and the position limiting sheet are mounted in an adjustment space of the adjustment tube, wherein the position limiting sheet is connected to a first end portion of the spring; and
   a piston sheet mounted in the adjustment space of the adjustment tube and connected to a second end portion of the spring.

6. The pedal reaction simulator apparatus of claim 5, wherein the adjustment device further includes a connection tube located between the adjustment space and the first accommodation space, and providing a connection space for accommodating the rack member therein so that the rack member enters the first accommodation space through the connection space and is engaged with the tooth portion of the rotation element.

7. The pedal reaction simulator apparatus of claim 6, further including a notch formed in the position limiting sheet, so that a fluid in the cylinder flows to the adjustment tube through the connection tube and the notch of the position limiting sheet.

8. The pedal reaction simulator apparatus of claim 7, further including a protrusion formed on the position limiting sheet so that the protrusion allows the position limiting sheet to be spaced from the connection tube by a predetermined distance in the adjustment tube.

9. The pedal reaction simulator apparatus of claim 4, wherein the adjustment device includes:
an adjustment tube having a first tube diameter, provided to be connected to the first accommodation space of the cylinder in a tangential direction of the rotation element, and providing an adjustment space for accommodating the spring and the position limiting sheet therein;
a connection tube having a second tube diameter, located between the adjustment space and the first accommodation space, and providing a connection space for accommodating the rack member therein so that the rack member enters the first accommodation space through the connection space and is engaged with the tooth portion of the rotation element; and
a piston sheet provided on the adjustment space and connected to the spring.

10. The pedal reaction simulator apparatus of claim 9, wherein the position limiting sheet and the piston sheet are movable in the adjustment space, the spring is connected between the position limiting sheet and the piston sheet, and
wherein a pressure adjustment oil is filled in the adjustment tube on an opposite side of the cylinder with respect to the piston sheet, and a pressure of the pressure adjustment oil in the adjustment tube is adjusted to adjust the preload of the spring.

11. The pedal reaction simulator apparatus of claim 9, wherein the second tube diameter of the connection tube is smaller than the first tube diameter of the adjustment tube to limit the position limiting sheet of the adjustment tube from entering the connection tube.

12. The pedal reaction simulator apparatus of claim 10, wherein the adjustment device further includes a pressure sensor provided in the adjustment tube on the opposite side of the cylinder with respect to the piston sheet, and detecting a pressure of the pressure adjustment oil in the adjustment tube,
wherein in response that the pressure of the pressure adjustment oil in the adjustment tube is higher than a predetermined pressure, the preload of the spring is increased, and a relatively large resistance is provided against the rotation of the rotation element, and
wherein in response that the pressure of the pressure adjustment oil in the adjustment tube is lower than the predetermined pressure, the preload of the spring is decreased, and a relatively small resistance is provided against the rotation of the rotation element.

13. The pedal reaction simulator apparatus of claim 1, wherein the rotation resistance device includes a locking groove formed on the external circumferential wall of the second end portion of the rotation element, and
wherein a first end portion of the second elastic element is coupled to the locking groove, and a second end portion of the second elastic element is coupled to the adjustment device so that the rotation resistance device is configured to provide the resistance to the rotation of the rotation element through elastic deformation of the second elastic element due to the rotation of the rotation element.

14. The pedal reaction simulator apparatus of claim 13, wherein the second elastic element is a torsion spring or a coil spring,
wherein the adjustment device includes a push rod and an actuator,
wherein a first end portion of the push rod is connected to the torsion spring or the coil spring, and
wherein the actuator is connected to a second end portion of the push rod and configured to adjust the preload of the torsion spring or the coil spring by pushing or pulling the push rod.

15. The pedal reaction simulator apparatus of claim 1, further including:
a support assembly provided at the second end portion of the rotation element to support the rotation element and the first elastic element provided in the rotation element.

16. The pedal reaction simulator apparatus of claim 15, wherein the support assembly includes:
a thrust ball bearing connected to the second end portion of the rotation element and including a shaft ring and a race supporting the rotation element, and
a spring retainer cover including an external circumferential portion connected to the race of the thrust ball bearing to fix the thrust ball bearing and a center portion connected to the first elastic element to support the first elastic element.

* * * * *